United States Patent Office 2,751,349
Patented June 19, 1956

2,751,349

WATER RESISTANT LUBRICANTS THICKENED WITH INORGANIC GELLING AGENTS

William A. Marshall, Chicago, Ill., and Charles F. Steininger, Havertown, Pa., assignors to The Pure Oil Company, Chicago, Ill., a corporation of Ohio No Drawing. Application May 21, 1954,
Serial No. 431,583

7 Claims. (Cl. 252—28)

This invention relates to the thickening of oleaginous liquids by means of finely divided inorganic gelatinous material and is especially directed to the preparation of greases employing inorganic gelling agents for use in high temperature applications.

Although lubricating greases by ASTM definition are semi-solid or solid combinations of a petroleum product and a soap or a mixture of soaps, there have been developed a number of compositions which do not employ petroleum oils as the base constituent and a number of thickeners for these base liquids which are non-soap gelling agents and can be used in the preparation of thickened compositions which functionally are the equivalent of a true lubricating grease. Furthermore, the lubricating compositions thus prepared have properties in which soap-containing petroleum base lubricating greases are generally deficient. In spite of the fact that the compositions of this invention do not conform with the conventional definition of a grease, they will hereinafter be included in this category in order to facilitate the discussion of the instant invention.

A non-soap gelling agent which has found considerable application in the preparation of lubricating greases is finely divided silica. This material having a structure which will hereinafter be discussed, when dispersed in a suitable liquid medium including petroleum oil lubricating fractions, will produce a gelatinous composition with a greaselike structure having lubricating properties. The development of inorganic gelling agents apparently originated in Germany during World War II as a solution to the shortage of conventional grease making components. Greases employing inorganic gelling agents can be prepared in the standard type of grease making equipment without requiring unusual processing conditions. Although the greases thickened with inorganic gelling agents are suitable for multi-service duty, their resistance to changes in consistency over a wide temperature range makes them very desirable compositions for high temperature applications. While the consistency of soap thickened greases at elevated temperature is inimicably affected, greases thickened with inorganic gelling agents retain their grease structure. If working of these greases has occurred, the base oil may distill or even ignite, but no melting of the grease results. Unfortunately these multi-purpose greases do not present an ideal solution to lubricating problems inasmuch as one serious deficiency in greases thickened with inorganic gelling agents is demonstrated by their lack of water resistance. This characteristic is fatal because exposure of a simple admixture of silica and oil to water results in the rapid disintegration of the mixture into its component parts. However, this difficulty may be overcome by treating the gelling agents employed in the preparation of these greases with suitable reagents the inorganic gel-oil composition can be stabilized against the detrimental effect of water.

It is therefore, an object of this invention to thicken a liquid oleaginous liquid with an inorganic gelling agent to prepare a gelatinous composition which resists dispersion when in contact with water. It is a further object of this invention to prepare a water resistant grease prepared with inorganic gelling agents by suitably treating the gelling agents employed in the grease preparation. These and other objects will be made more apparent from the following discussion of the instant invention.

According to this invention hydrophobic gelatinous compositions having lubricating properties can be prepared by incorporating into an oleaginous base an inorganic hydrophilic gelling agent and a tin halide, the latter constituent functioning as a waterproofing agent for the gelling agent. In carrying out this invention, it is preferred that tin halides which are normally liquids be employed in order to facilitate the manufacture of the composition. Examples of suitable compounds of this nature include $SnBr_3Cl$, $SnBrCl_3$, $SnCl_4$, $SnCl_2I_2$. This property permits the liquid halide to be incorporated in the composition in any convenient fashion such as pretreatment of the gelling agent by contacting it with the liquid halide, or introducing the halide during the formulation of the gelatinous composition. In the event that a crystalline halide such as $SnBr_2$, $SnBr_4$, $SnCl_2$, $SnI_2$, $SnF_4$, etc. is employed it will be necessary to prepare a solution of the halide by employing alcohol, ether, benzene, acetone or other suitable substance as a solvent. The gelling agent is contacted with the solution and wetted thereby to remove the solvent material. By treating the gelling agent such as by heating the halide impregnated gel at a temperature sufficient to drive off the solvent without effecting the removal of any of the halide, the agent is made water resistant by the remaining halide. It is evident that the presence of the halide produces a surface active effect which is made manifest by the production of a hydrophobic gelling agent from one which is inherently hydrophilic in nature. The amount of tin halide which may be employed for improving the water resistance of gelatinous compositions having lubricating properties will depend upon the characteristics of the gelling agent. The proper amount of halide required to produce a hydrophobic composition is best determined experimentally. Generally about 1–35% by weight, based on the gelling agent, may be employed and preferably amounts between 8–25% by weight. However, it may be necessary to employ amounts in excess of these proportions in exceptional circumstances.

The preferred oleaginous liquids used in the invention are those petroleum oils which are in the lubricating oil range. Any suitable refined lubricating oil which has the desired viscosity characteristics may be used such as various neutral and bright stock oils, either alone, in combination with each other, or with minor amounts of mineral oil extracts obtained in the solvent refining of mineral oils with conventional selective solvents. Otherwise synthetic liquids may be employed as the oleaginous base. These include silicones fluids, liquid polyoxyalkylene glycols and their derivatives, esters, prepared from dicarboxylic acids, polymerized olefins, etc. This constituent forms the major portion of the lubricating composition.

The gelling agent which may be employed in this invention include a number of substances. There are a number of inorganic materials which impart poor water resistance to greases in which they are employed as gelling agents. These include inorganic gels formed from the polyvalent metal oxides and hydroxides. The most commonly employed gelling agent of this nature is silica gel in the so-called aerogel form prepared in accordance with the instructions set forth by Kistler in U. S. Patent 2,260,625. Similar aerogels suitable for use in this invention may also be prepared from the oxides and hydroxides of alumina, calcium, chromium, cobalt, germanium, iron, lead, manganese, molybdenum, nickel, etc.

and may be treated in accordance with this invention to produce gelling agents which will form water resistant greases.

The instant invention is not concerned with inorganic gelling agents per se but rather with imparting water resistance to the substances by a suitable treatment thereof. Accordingly any of the conventional water-susceptible, inorganic amorphous gelling agents which have known application as gelling agents in the preparation of lubricants of grease-like consistency are considered within the scope of this invention.

Lubricating compositions employing this invention can be prepared without resorting to special precautions. Conventional grease-making equipment and techniques can be employed. If the gelling agent is of sufficiently small particle size a satisfactory composition can be prepared by simple admixing of the gelling agent and the oleaginous vehicle. A gelling agent having the desired particle size is marketed as Santocel ARD by Monsanto Chemical Co. Other gelling agents require the milling of the gel-oil mixture in conventional grease making equipment, such as a Charlotte colloid mill, in order to produce a gelatinous composition. Sufficient amounts of gelling agent to provide a composition having a desired consistency are employed. This generally requires amounts from about 2–20% by weight, based on the total composition, of the gelling agent. However satisfactory compositions can be prepared using from about 5–14% by weight. As it was pointed out above, the method whereby the waterproofing substance of this invention is added depends upon the physical state of the halide employed. While crystalline halides must be added to the gelling agent surfaces by means of a pretreatment process, liquid tin halides may be introduced during the processing. In any event precautions must be taken to insure the intimate contacting of the gelling agent with the halide in order to impart water resistance characteristics to the gelling agent. For further information on the preparation and properties of oils thickened with amorphous inorganic gelling agents, reference is made to the Institute Spokesman, XVI (10) at page 18 et seq. where silica aerogel-thickened greases are comprehensively considered.

In accordance with this invention a gelatinous lubricating composition is prepared by admixing 90 parts by weight of a petroleum oil lubricating fraction consisting of a 100 V. I. 85 viscosity neutral lubricating oil obtained from a Van Zandt crude oil, 10 parts by weight of a silica aerogel (Santocel ARD) and 2 parts by weight of stannic chloride. Upon intimately contacting the admixture in a suitable mixing device a thickened composition of greaselike consistency, having excellent water resistance is produced.

In the event that the lubricant is employed in special applications various functional additives such as E. P. agents, anti-oxidants, rust preventatives, etc. may be incorporated in the composition to provide properties in which the lubricant is inherently deficient.

We claim as our invention:

1. A gelatinous composition having lubricating qualities which comprises a major portion of an oleaginous lubricating liquid having incorporated therein a sufficient amount of an inorganic gelling agent to produce a gelatinous composition of greaselike consistency, the surfaces of said gelling agent being treated with a tin halide in an amount sufficient to impart water resistance characteristics to said composition.

2. A gelatinous composition having lubricating qualities which comprises a major portion of an oleaginous lubricating liquid having incorporated therein a sufficient amount of a siliceous gelling agent to produce a gelatinous composition of greaselike consistency, the surfaces of said gelling agent being treated with a tin halide in an amount sufficient to impart water resistance characteristics to said composition.

3. A composition in accordance with claim 2 in which the surfaces of said gelling agent are treated with a liquid tin halide.

4. A composition in accordance with claim 3 in which the liquid halide is stannic chloride.

5. A gelatinous composition having lubricating qualities which comprises a major portion of an oleaginous liquid having incorporated therein a sufficient amount of a silica aerogel to produce a gelatinous composition of greaselike consistency and 1–35% by weight, based on said aerogel, of a liquid tin halide, said tin halide imparting water resistance characteristics to said composition.

6. A gelatinous composition having lubricating qualities which comprises a major portion of a petroleum oil lubricating fraction having incorporated therein 2–20% by weight based on the total composition, of a silica aerogel, 1–35% by weight based on said aerogel of a liquid tin halide wherein the surfaces of said gelling agent are treated with said halide to impart water resistance characteristics to said composition.

7. A composition in accordance with claim 6 in which the tin halide is stannic chloride.

References Cited in the file of this patent

UNITED STATES PATENTS

| | | |
|---|---|---|
| 2,260,625 | Kistler | Oct. 28, 1941 |
| 2,446,251 | Stricklin | Aug. 3, 1948 |

FOREIGN PATENTS

| | | |
|---|---|---|
| 2,579 | Great Britain | Oct. 23, 1860 |
| 1,522 | Great Britain | May 31, 1866 |
| 3,108 | Great Britain | Sept. 23, 1873 |
| 24,801 | Great Britain | Nov. 14, 1903 |